ative steps of: first, preblocking the thickened material adjacent to the zipper closure portions of the material in areas thereof to be severed and sealed; then, applying heat and pressure to the thickened material and remaining sections of the material in those areas to render the material tacky and temporarily stick the multiple plies together in those areas; and, thereafter, contacting those areas of the material with a heated cutting and sealing element in order to sever all of the multiple plies and seal the severed margins thereof. Further, after the application of heat and pressure, the zipper closure portions of the material in the areas thereof to be severed and sealed are preheated. Also, after the margins of the multiple plies of material are severed and sealed, pressure is applied to the zipper closure portions at the severed and sealed margins to ensuring sealing thereof.

United States Patent [19]

Woods et al.

[11] Patent Number: 4,812,192

[45] Date of Patent: Mar. 14, 1989

[54] PROCESS AND APPARATUS FOR CUTTING AND SEALING MULTIPLE PLIES OF THERMOPLASTIC MATERIAL HAVING THICKENED SECTIONS

[75] Inventors: Timothy R. Woods; R. Douglas Behr, both of Midland, Mich.

[73] Assignee: The Dow Chemical Company, Midland, Mich.

[21] Appl. No.: 179,791

[22] Filed: Apr. 11, 1988

[51] Int. Cl.⁴ ............................................. B32B 31/18
[52] U.S. Cl. ........................................ 156/251; 156/66; 156/499; 156/515; 156/518; 156/530; 156/581
[58] Field of Search ............... 156/251, 499, 515, 518, 156/530, 581, 66; 383/63, 107, 114

[56] References Cited

U.S. PATENT DOCUMENTS

| | | | |
|---|---|---|---|
| 3,033,257 | 5/1962 | Weber | 156/251 |
| 3,853,671 | 12/1974 | Ausnit | 156/66 |
| 3,986,914 | 10/1976 | Howard | 156/251 |
| 4,024,010 | 5/1977 | Boccia | 156/251 |
| 4,304,615 | 12/1981 | Seigel | 156/251 |
| 4,396,449 | 8/1983 | Tumminia | 156/251 |
| 4,561,109 | 12/1985 | Herrington | 156/66 |
| 4,658,433 | 4/1987 | Savicki | 383/63 |

Primary Examiner—Caleb Weston

[57] ABSTRACT

A process and apparatus is provided for cutting multiple plies of thermoplastic material having thickened sections, such as defined by cross-sections of matable parts of a zipper closure formed in the material, and for concurrently sealing the severed margins of the material which includes sealing the severed zipper closure portions thereof. The process and apparatus perform the oper 44 Claims, 4 Drawing Sheets

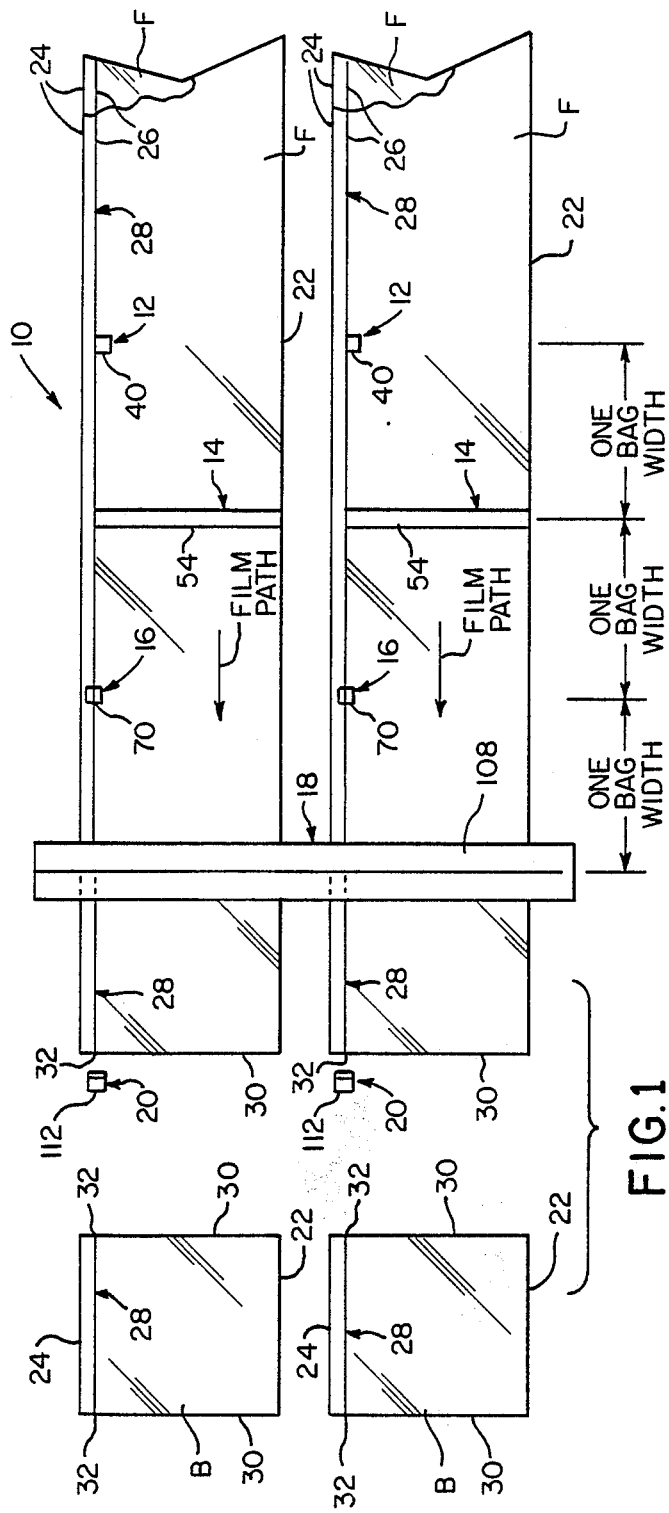
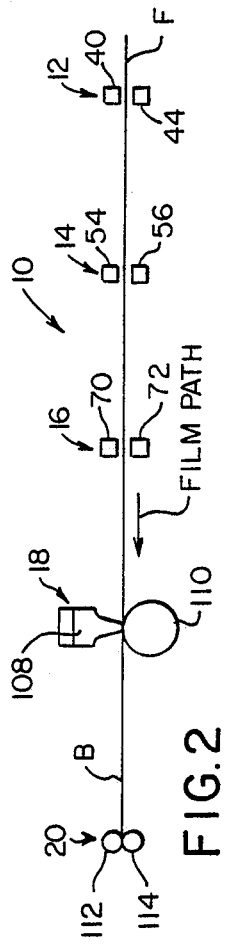
FIG. 1
FIG. 2

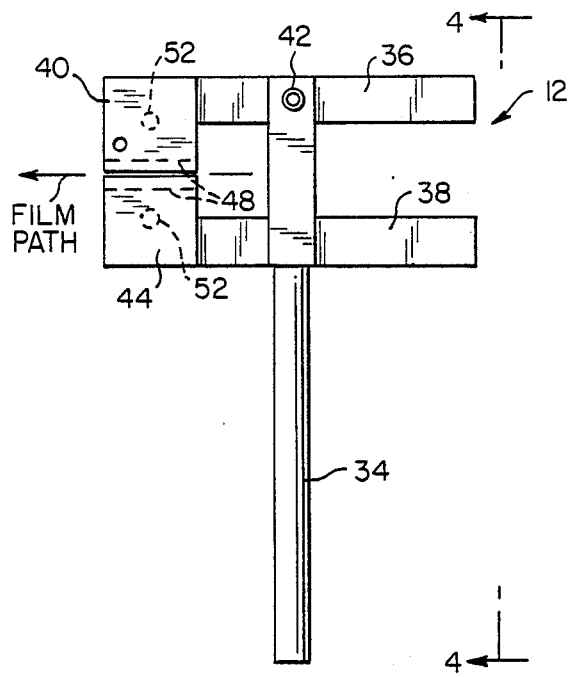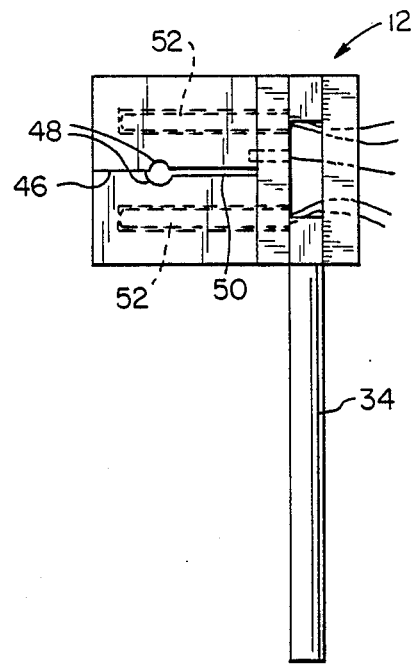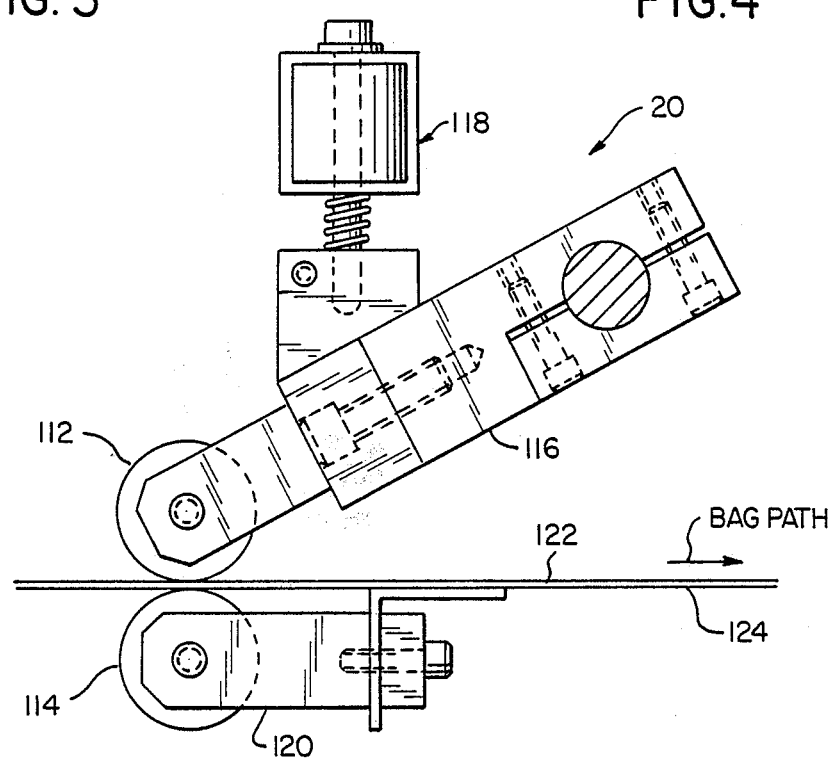

PROCESS AND APPARATUS FOR CUTTING AND SEALING MULTIPLE PLIES OF THERMOPLASTIC MATERIAL HAVING THICKENED SECTIONS

BACKGROUND OF THE INVENTION

The present invention generally relates to the manufacture of thermoplastic bags and, more particularly, to a process and apparatus for cutting and sealing multiple plies of thermoplastic material in the manufacture of articles, such as bags, having thickened sections, such as zipper closures.

For many years, devices for concurrently cutting and sealing multiple plies of thermoplastic material (hereinafter referred to as cutter/sealer devices) have been used to manufacture plastic trash bags, folded sandwich bags and other non-zippered bags from uniform film stock. U.S. Pat. No. 3,033,257 to Weber discloses an example of one such prior art device. Generally speaking, quality seals can be produced at high cycle rates by a cutter/sealer device due to the uniformity of thickness of the film stock used.

More recently, cutter/sealer devices have been employed in the manufacture of bags from multiple plies of thermoplastic film of non-uniform thicknesses. U.S. Patents to Howard (U.S. Pat. No. 3,986,914), Boccia (U.S. Pat. No. 4,024,010), Siegel (U.S. Pat. No. 4,304,615), Tumminia (U.S. Pat. No 4,396,449) and Savicki (U.S. Pat. No. 4,658,433) disclose examples of such prior art devices. The non-uniformity of film thickness is due to the provision of integral and nonintegral zipper closures thereon which have substantially greater thickness than the remainder of the film, for example, a 70 mil thick zipper closure provided on a 2 mil thick film.

Processing of non-uniform thickness or zippered film stock into plastic bags introduces several problems which can lead to an increase in leaks along the sealed longitudinal side edges of the bag at the zipper closure end seals as well as at the remaining longitudinal side edge seals. One problem relates to the manner in which the cutter/sealer device has to be operated to cut and seal the thicker zipper closure area. The thicker zipper closure requires the device to be operated at higher temperatures and lower cycle speeds in order to cut through the zipper closure. These operating conditions will tend to produce rougher and more distorted seals along the remainder of the longitudinal side edges of the bag. These distorted areas are often potential sites of leaks in the plastic bag.

Another problem relates to stretching of the film caused by winding over the thicker profile created by the presence of the zipper closure on the film. Since the zippered film stock is wound under tension on mill rolls, it typically stretches due to being wound on top of the thicker profile. Stretching of the film promotes the occurrence of additional problems, such as film wrinkling, entrapping of air, and inadequate film creasing during folding, all of which provide additional potential sites for leaks.

Attempts have been made in the prior art to address the problem of processing zippered film stock to provide a bag having leak proof seals. Such attempts have pretreated the film stock using a combination of heat and pressure to smash the zippered portion of the film stock to reduce the thickness presented to the hot knife to sever and seal through. Heat has been produced either thermally or through the use of ultrasonic vibrations. However, while such attempts have improved somewhat the integrity of the side weld seals at the zipper closure portions of the bag, the processes used have resulted in leaks appearing elsewhere in the bag and through the zipper closure which results from distortion in the zipper closure introduced by the application of pressure during preheating.

Consequently, a need exists for improvements which will better adapt a cutter/sealer device for use in manufacture of plastic bags from non-uniform thickness film stock, primarily film having thickened sections due to the presence of zipper closures.

SUMMARY OF THE INVENTION

The present invention provides process and apparatus designed to satisfy the aforementioned needs. The process and apparatus of the present invention are directed to cutting multiple plies of thermoplastic material having thickened sections, such as those created by the presence of zipper closures, and concurrently sealing the severed margins thereof to provide products with improved leak-proof seals.

The process and apparatus preferably incorporate the following combination of operative steps: (a) preblocking the thermoplastic material in the areas of the material to be severed and sealed located adjacent to the zipper closures thereof; (b) next, blocking the thermoplastic material in the areas of the material to be severed and sealed located both adjacent to the zipper closures and throughout the remaining sections thereof to render the thermoplastic material tacky and temporarily stick the multiple plies together in those areas; and (c) then, contacting all of those areas of the thermoplastic material to be severed and sealed with a heating cutting and sealing element so as to sever all of the multiple plies and concurrently seal the severed margins thereof together.

The process and apparatus further comprise the steps of: after step (b) but before step (c), preheating the zipper closure portions of the thermoplastic material in those areas thereof to be severed and sealed by applying heat thereto; and, after step (c), stomping the thickened sections at the severed and sealed margins of the material to ensure sealing thereof.

More particularly, the preblocking of the material adjacent to the zipper closures thereof is performed by applying heat thereto. The blocking of the material both adjacent to the zipper closures and throughout the remaining sections thereof is performed by concurrently applying both heat and pressure thereto. The heat applied by blocking of the material is lower than the temperature of the heat applied in the preheating of the zipper closure portions of the material. The stomping is performed by applying pressure to the thickened sections at the severed and sealed margins of the material.

Still further, the preblocking of the material occurs at a site which is three-severed-material widths from a site at which occurs the contacting of the material with the heated cutting and sealing element. The blocking of the material occurs at a site which is two-severed-material widths from the site at which the contacting of the material occurs. The preheating of the zipper closures occurs at a site which is one-severedmaterial width from the material contacting site.

The features incorporated by the cutting and sealing apparatus for carrying out the aformentioned operative steps are a preblocking component, a blocking component, a zipper closure preheating component and a post stomping component.

The present invention also relates to a preheating component for use in preheating the zipper closure portions of multiple plies of thermoplastic material prior to cutting of the plies and sealing the severed margins thereof. The preheating component comprises: (a) a pair of block-like elements adapted to apply heat to the zipper closure portions of the material in the areas to be severed and sealed; (b) a pair of guide elements adapted to receive the zipper closure portions of the material therebetween and to guide the same in alignment with the block-like elements; and (c) mounting means for disposing the block-like elements and the guide elements on opposite sides of the material, supporting the block-like elements for relative movement toward and away from each other, and supporting the guide elements for relative movement toward and away from each other. At least one of the block-like elements is adapted to be heated.

More particularly, the mounting means includes a pair of arms adapted to be mounted at the same respective ends for pivotal movement toward and away from one another. The arms support the respective block-like elements at locations spaced from the same respective ends of the arms. The preheating component further comprises actuating means disposed adjacent the arms and being operable to cause pivotal movement of the arms and the block-like elements therewith. The arms have defined thereon at the same respective ends thereof oppositely inclined cam lobes. The actuating means includes an actuator operable for movement between extended and retracted positions, and a wedge element connected to the actuator and disposed between the cam lobes on the arms. The wedge element is adapted to engage the cam lobes and cause pivotal movement of the arms away from one another and to permit pivotal movement of the arms toward one another upon movement of the actuator correspondingly between its extended and retracted positions.

Accordingly, it is an object of the present invention to provide a cutting and sealing process and apparatus incorporating a combination of features which greatly improved final bag quality by enhancing overall side edge seal appearance, reducing side edge seal leaks, zipper closure end seal leaks and leaks through the zipper closure profile. Other objects and advantages of the invention will be apparent from the following descriptions, the accompanying drawings and the appended claims.

BRIEF DESCRIPTION OF THE DRAWINGS

FIG. 1 is a schematic top plan view of a cutting and sealing apparatus in accordance with the principles of the present invention.

FIG. 2 is a schematic side elevational view of the apparatus of FIG. 1.

FIG. 3 is an enlarged side elevational view of a preblocking component incorporated by the apparatus of FIG. 1.

FIG. 4 is an end elevational view of the preblocking component as seen along line 4—4 of FIG. 3.

FIG. 11 is an enlarged side elevational view of a post stomping component of the apparatus of FIG. 1.

DETAILED DESCRIPTION OF THE PREFERRED EMBODIMENT

Figure 5:
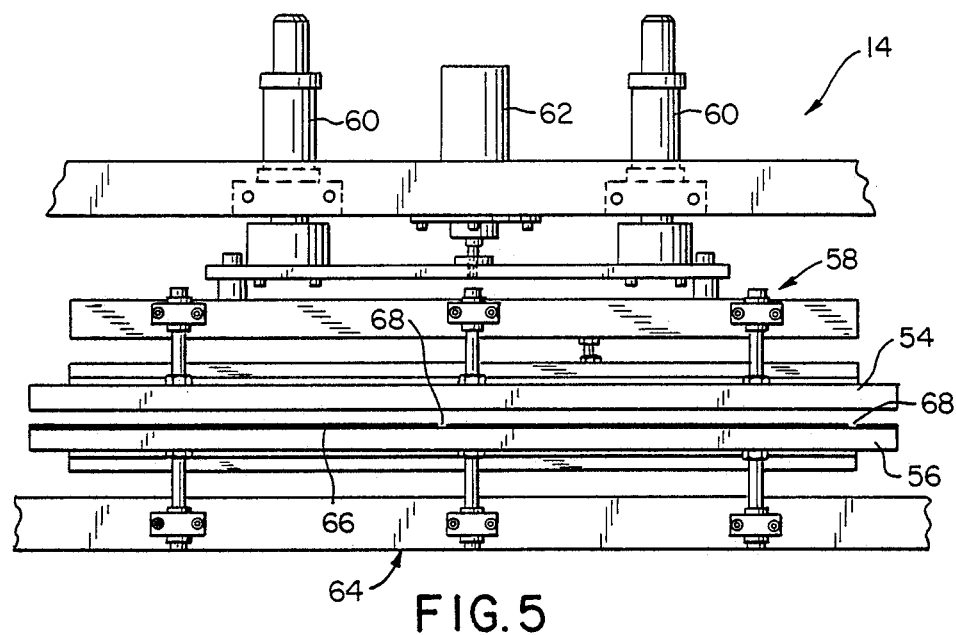
FIG. 5 is an enlarged end elevational view of a blocking component incorporated by the apparatus of FIG. 1.

Reference is made to FIGS. 1 and 2 of the drawings which schematically illustrate an apparatus for concurrently cutting and sealing multiple plies of thermoplastic material, the apparatus being generally designated by the numeral 10 and incorporating the improvements of the present invention. In its basic components, the cutting and sealing apparatus 10 includes a preblocking component 12, a blocking component 14, a zipper closure preheating component 16, a cutting and sealing component 18, and a stomping component 20. The aforementioned components are provided in a generally serial arrangement wherein each component is located from the next through a distance equal to the width of one plastic bag B, as depicted in FIGS. 1 and 2. Thus, the preblocking, blocking and zipper closure preheating components 12–16 are located at stations or sites respectively three—two— and one-bag-widths upstream from the station or site of the cutting and sealing component 18, whereas the stomping component 20 is located at a station or site slightly more than one-bag-width downstream from the site of the cutting and sealing component 18.

The components of the apparatus 10 are depicted schematically in FIGS. 1 and 2 and with more detail in later figures. However, an overall framework of the apparatus 10 for mounting the components and a feeding device for intermittently advancing a continuous film F of thermoplastic material through the apparatus and past the sites of the components thereof have not been shown in the drawings. The constructions of such framework and feeding device of the apparatus 10 are well known per se and to illustrate them herein would not contribue to a clearer understanding of the present invention but would tend to make such understanding more difficult.

As illustrated in FIG. 1, multiple plies, for instance two plies, of a thermoplastic material film F have been provided by a folding operation performed at a earlier upstream station (not shown). Thus, the film F is closed and folded along its lower edge 22 and open along its upper edges 24 when it reaches preblocking component 12, the first in the illustrated serial arrangement of components, of apparatus 10. The film F has thickened sections formed by matable halves or parts 26 of a zipper closure 28. Except in the area of the zipper closures, film F is generally uniform in thickness. For example, film F might have a 70 mil thick zipper closure, whereas the remainder of the film might be 2 mil thick. Preferably, before film F reaches preblocking component 12, the matable parts 26 of its zipper closure 28 will have been closed or mated together.

The upstream preblocking, blocking and zipper closure preheating components 12-16 of apparatus 10 cooperate to precondition the thermoplastic film F and zipper closure 28 in order that the side welds will be leak proof after the multiple plies of the film have been cut and sealed by the cutting and sealing component 18 to produce individual plastic bags B from folded film F. The completed bag B has seals along opposite side edges 30 thereof and at ends 32 of the matable parts 26 of the zipper closure 28 thereof. The downstream stomping component 20 post-conditions ends 32 of closure 28 to ensure that sealing thereof is achieved.

In the process performed by apparatus 10, the first step—preblocking of the thermoplastic material of film F adjacent to zipper closure 28—is performed by application of heat to the material by preblocking component 12. The heat is applied only in areas of the film material to be severed and sealed that are located adjacent to and below the zipper closure 28, for example, in an area extending up to about one-half inch below the zipper closure. Heat is applied by preblocking component 12 at a temperature within a range of 190 to 220° F. and, preferably, at a temperature of about 200° F. This area of the film adjacent to zipper closure 28 is ordinarly thicker than the remainder of the film, for example, 4 to 6 mils thick compared to 2 mils elsewhere. Thus, preblocking in this area adds additional heat to the area adjacent zipper closure 28 only. It aids in the elimination of side edge seal leaks. That is, successful preblocking, when followed by successful blocking, has been found to eliminate all side edge seal leaks in the film.

As seen in FIGS. 1 and 2, and in greater detail in FIGS. 3 and 4, preblocking component 12 of apparatus 10 is disposed adjacent the upper edges 24 of film F and includes a mounting shaft 34 having upper and lower elongated support members 36, 38 mounted in vertically spaced relation at its upper end. The upper support member 36 mounts a block-like member 40 at its downstream end and, in turn, is pivotally mounted at 42 to the shaft 34. The lower support member 38 mounts a block-like member 44 at its downstream end and, in turn, is stationarily mounted to the shaft 34. Thus, the pair of block-like members 40, 44 are mounted for relative movement toward and away from each other and are disposed on opposite sides of film F of thermoplastic material. Further, block-like members 40, 44 face toward, and at edges 46 thereof are engagable with, the areas of the film material to be severed and sealed which are located adjacent to and below the zipper closure. A notch 48 and slot 50 are defined by block-like members 40, 44 for preventing the members 40, 44 from engaging, respectively, the zipper closure 28 and a thickened grip strip (not shown) provided along the upper edge 24 of the film F.

At least one of the block-like members 40, 44 is heated. In the embodiment illustrated in FIGS. 3 and 4, both members 40, 44 are heated via heater 52 embedded therein. By operating in the above-noted temperature range, sufficient heat can be applied to this area while operating at a low enough set point that film melting will not occur if apparatus 10 is stopped with block-like members 40, 44 of preblocking component 12 remaining in contact with the film during the stoppage. If higher heat values should be required, both of the members 40, 44 can be redesigned to open out of contact with the film when the apparatus stops.

Also, in the process performed by the apparatus 10, the second step—blocking of the thermoplastic material of film F—is performed by applying concurrently both heat and pressure to the material by blocking component 14. Heat and pressure are applied in areas of the film material to be severed and sealed that are located both adjacent to and extending about one-half inch below zipper closure 28, as described above, and also throughout the remaining sections of the material extending to the lower edge 22 thereof. Heat is applied by blocking component 14 at a temperature within a range of 250 to 300° F. and, preferably, at a temperature of about 270° F. Thus, the blocking temperature is sufficiently higher to render the thermoplastic material tacky and to cause the multiple plies to temporarily stick together in these areas. The pressure applied is preferably in the range of 5 to 15 psi.

Figure 6:
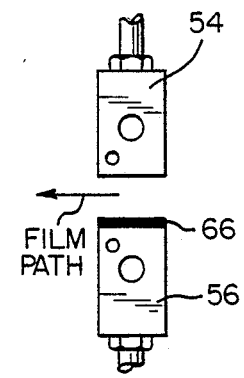
FIG. 6 is an enlarged fragmentary side elevational view of the blocking component of FIG. 5.

As illustrated in FIGS. 1 and 2, and in greater detail in FIGS. 5 and 6, blocking component 14 includes a pair of elongated upper and lower bar-like members 54, 56 mounted for relative movement toward and away from each other and being disposed on opposite sides of film F. The bar-like members 54, 56 face toward the above-described areas of the film to be severed and sealed. Upper bar-like members 54 is supported by a superstructure 58 mounted for vertical movement within a pair of linear motion bearings 60 and connected to an actuator 62, such as an air cylinder, which is operable for moving superstructure 58 and member 54 toward and away from lower bar-like member 56. The latter member 56 is stationarily-disposed by a substructure 64.

Preferably, upper bar-like member 54 of blocking component 14 is heated by any suitable means, whereas lower bar-like member 56 includes thereon a coating 66 of resiliently yieldable material, such as a rubber insert, facing toward upper member 54 and film F of material extending therebetween. Coating 66 has a slot 68 defined therein aligned to receive the thicker zipper closure 28 of thermoplastic material. (Two such slots 68 are shown in FIG. 4 since the embodiment of the blocking component illustrated is adapted to accommodate the processing of two side-by-side films of material.)

In the aforementioned temperature range, blocking component 14 is intended to operate at a high enough temperature to make the folded layers or plies of film F tacky and stick together without actually sealing them to one another. Due to the heat added by the earlier preblocking step, this condition is imposed on the material from the lower edge of zipper closure 28 to the lower edge 22 of the folded film. The width of the bar-like members 54, 56 is preferably approximately three-fourths inch, although smaller widths can be used. Also lower member 56 can also be heated. The presence of slot 68 in the coating 66 allows the application of a uniform pressure across the film material which also improves film blocking in the area thereof to be cut and sealed later by component 18.

The use of the blocking component 14 improves the integrity of longitudinal side edge seals of the bag B. Bottom corner holes are eliminated because the layers or plies are not tacked together. Side seal wrinkles, although still present in the film, do not leak because a uniform seal bead is formed around them.

Further, in the process performed by apparatus 10, the third step—preheating the thickened zipper closure 28 of the film F—is performed by applying heat to zipper closure 28 by preheating component 16. Heat is applied in areas of zipper closure 28 to be severed and sealed which are longitudinally aligned with the above-described areas of the remaining film material to be severed and sealed. Heat is applied by preheating component 16 at a temperature within a range of 350 to 550° F. (depending upon the zipper closure size and thickness). Thus, the preheating temperature is higher than both of the preblocking and blocking temperatures.

Figure 7:
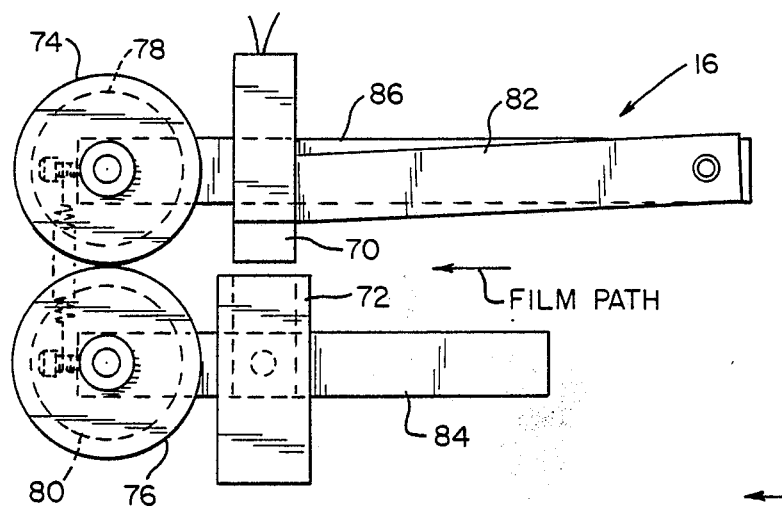
FIG. 7 is an enlarged side elevational view of one embodiment of a zipper closure preheating component incorporated by the apparatus of FIG. 1.

As illustrated in FIGS. 1 and 2, and in greater detail in FIG. 7, preheating component 16 includes a pair of upper and lower block-like elements 70, 72 adapted to apply heat to opposite sides of thickened zipper closure 28 of film F in the areas thereof to be severed and sealed. Also, component 16 includes a pair of upper and lower guide elements 74, 76 having respective peripheral grooves or recesses 78, 80 adapted to receive zipper closure 28 therebetween in order to guide the same in alignment with heat-applying block-like elements 70, 72. An arm 82 supports upper block-like element 70 for pivotal movement toward and away from lower block-like element 72 which is stationarily supported by an arm 84. A lever 86 rotatably supports upper guide element 74 for pivotal movement toward and away from lower guide element 76 which is also rotatably supported by arm 84. The upper and lower block-like elements 70, 72 and corresponding upper and lower guide elements 74, 76, being located downstream of the elements 70, 72, are respectively disposed on opposite sides of film F. At least one and preferably both of the block-like elements are heated by any suitable means.

Figure 8:
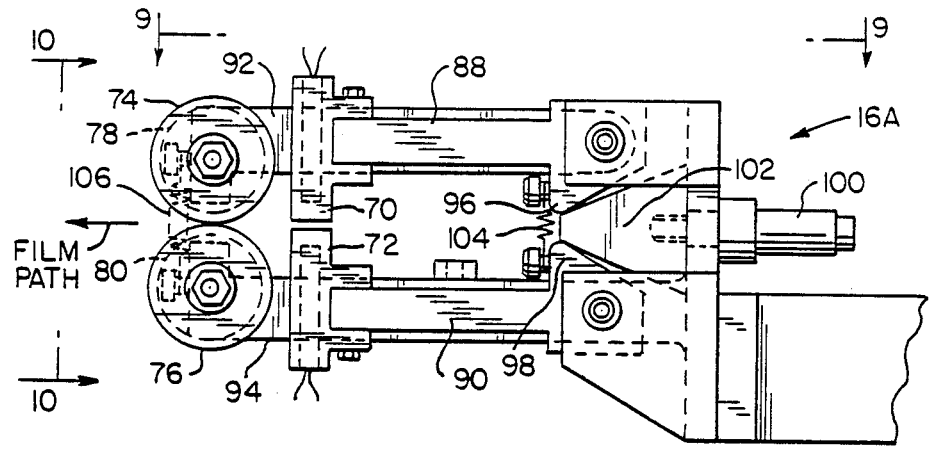
FIG. 8 is an enlarged side elevational view of another embodiment of the zipper closure preheating component of the apparatus of FIG. 1.
Figure 10:
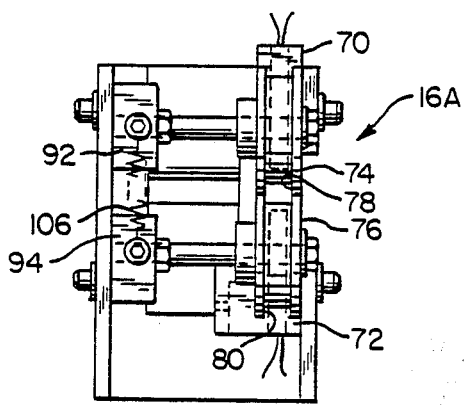
FIG. 10 is an end elevational view of the zipper closure preheating component as seen along line 10—10 of FIG. 8.
Figure 9:
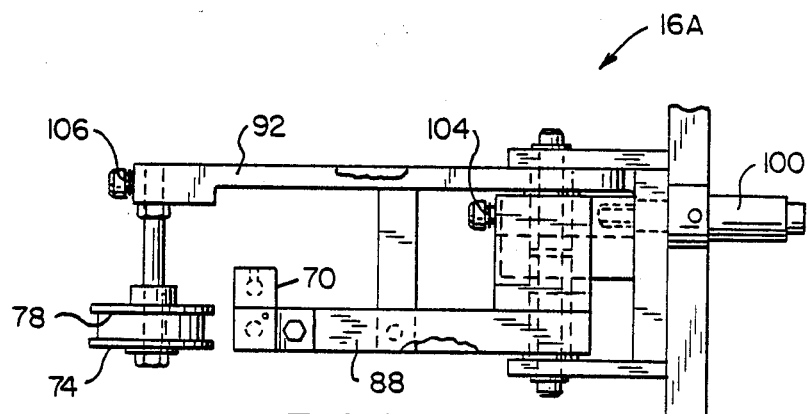
FIG. 9 is a top plan view of the zipper closure preheating component as seen along line 9—9 of FIG. 8.

FIGS. 8–10 illustrate an improved embodiment of the preheating component over the embodiment of FIG. 7. The preheating component 16A of FIGS. 8–10 has substantially the same basic makeup as that of FIG. 7; however, now both the upper and lower block-like elements 70, 72 are supported on respective pairs of upper and lower pivotal arms 88, 90.

More particularly, upper and lower arms 88, 90 are mounted at the same respective ends for pivotal movement toward and away from one another and support the respective block-like elements 70, 72 at locations spaced from the same respective ends thereof. The preheating component 16A also includes actuator means disposed adjacent the ends of arms 88, 90 and is operable to cause the pivotal movement of the arms and block-like elements 70, 72 therewith toward and away from one another. The upper and lower arms 88, 90 have defined thereon, at the same ends thereof, oppositely inclined upper and lower cam lobes 96, 98. The actuating means includes an actuator 100 operable for movement between extended and retracted positions, and a wedge element 102 connected to actuator 100 and disposed between cam lobes 96, 98 on arms 88, 90. The wedge element 102 is engaged with cam lobes 96, 98 for causing pivotal movement of arms 88, 90 away from one another and permitting pivotal movement of the arms toward one another upon movement of actuator 100 correspondingly between its extended and retracted positions. A spring 104 interconnects the arms 88, 90 at the same opposite ends thereof and biases the same for pivotal movement toward one another. The upper and lower levers 92, 94 are mounted at the same respective ends for pivotal movement toward and away from one another and rotatably support the respective guide elements 74, 76 at the same respective opposite ends thereof. A spring 106 interconnects the levers 92, 94 and biases the same for pivotal movement toward one another.

The advantage of the embodiment of the preheating component 16A of FIGS. 8–10 over the embodiment of the component 16 of FIG. 7 is that it allows retraction of the heated block-like elements 70, 72 away from the film material when apparatus 10 is stopped. Whereas retraction is achieved by using the wedge element 102, the same end effect could be achieved by using individual air cylinders. The preheating componoent 16 or 16A improves the seals at the opposite end 32 of the zipper closure 28 while minimizing leaks through the profile.

Still further, in the process performed by the apparatus 10, the fourth step—contacting the areas of the film F to be severed and sealed—is performed by cutting and sealing component 18. As schematically illustrated in FIGS. 1 and 2, cutting and sealing component 18 includes an upper hot knife 108 and a lower seal roll 110 adapted to cooperate in severing the plies of film F and concurrently seal their several margins together to form the seals at the longitudinal side edges 30 of bag B.

In order to improve the cutting ability of hot knife 108 at the zipper closure 28, several wraps of a resiliently yieldable tape such as a Teflon ® (polytetrafluoroethylene) tape or fiberglass tape which is impregnated with polytetrafluoroethylene (not shown) are applied to the lower seal roll 110 only at the circumferential region thereof aligned with the zipper closure 20 of film F. This increases the amount of knife penetration and results in improved cutting ability. By way of example, the amount of tape can be two wraps of one inch in width and two wraps of one-half inch in width. An increase in penetration of about 0.028 inch was experienced with use of this amount of tape. This amount of tape also allows larger profiles of zipper closures 28 to be cut successfully while operating apparatus 10 at a desired speed of approximately 60 cycles per minute while maintaining the temperature of hot knife 108 within the range of 520 to 650° F., and preferably at approximately 585–590° F., depending on the tape material on seal roll 110.

Finally, in the process performed by apparatus 10, the fifth step—stomping the seals at the ends 32 of the zipper closure 28 to ensure sealing thereof—is performed by a post stomping component 20. The stomping action applies pressure to the thickened zipper closure at the severed and sealed margins of the film material.

More particularly, as illustrated in FIGS. 1 and 2, and in greater detail in FIG. 11, stomping component 20 includes a pair of upper and lower rolls 112, 114 located downstream of hot knife 108, disposed on opposite sides of the film material and adapted to cooperate together to apply the necessary pressure to the severed and sealed ends 32 of closure 28. The upper roll 112 is rotatably mounted on the end of an upper pivotal member 116 which is yieldably biased by a adjustable spring assembly 118 toward lower roll 114, which is in turn rotatably mounted on the end of, and stationarily positioned by a bracket 120. Due to the heat and melted plastic remaining on the ends 32 of severed zipper closure 28, the upper and lower stomping rolls 114, 116 cooperate to roll the edges thereof closed thus ensuring the sealing of the seals at the zipper closure ends. Also shown in FIG. 11 is a pair of upper and lower conveyor pick-off belts 122, 124 which, when closed, transport the completed bag B under the stomping rolls 114, 116 and therefrom to a stacking station.

It has been found that stomping component 20 is particularly effective when used in combination with preheating component 16. Thus, the concept in employing stomping component 20 is to use the heat retained from the heat applied by preheating component 16 and by hot knife 108 to close off the zipper closure end seal if this was not done satisfactorily upstream at the hot knife 108.

The blocking, component 14, operates in timed relation with the cyclic motion of the cutting and sealing component 18 of apparatus 10. Specifically, while the film is advancing, the upper bar-like member 54 of blocking component 14, is in the upper retracted position out of the way of the advancing film. Then, when the film advancement stops and hot knife 108 and seal roll 110 of cutting and sealing component 18 are coacting to cut and seal the plies of the material to form the seal on the longitudinal side edge 30 of the bag B, the component is energized to perform the above-described functions. The pivoting motion of the preheater allows block-like elements 70 and 72 to be retracted whenever the sealer is stopped.

CONTROL TEST DATA

A controlled run was made to identify the effect each of the preblocking, blocking, preheating and post stomping components 12, 14, 16 and 20 adds to the overall side seal quality. The results are shown in Table 1 below. A total of 20 bags were tested. The experiments were done by removing a particular component and recording the leak results. The component was then returned to operation and the control condition reestablished. The various parameters of operating conditions were as follows:

Preblocking temperature = 200° F.
Blocking temperature = 280° F.
Preheating temperature = 680° F.
Cycle speed = 63 cycles/min.
Conveyor speed = 134 ft/min.
Penetration = 0.020 inch
Stomper roll in place
Teflon impregnated fiberglas tape on seal roll at zipper closure, 2 wraps, 1 inch wide, 2 wraps ½ inch wide
Leak rate = 2/20 leaks at zipper closure end seal

TABLE I

| | film longitudinal side edge seal number of leaks | zipper closure end seal number or leaks |
| --- | --- | --- |
| Control/No Preblocking | 0/3 | 2/1 |
| Control/No Blocking | 0/20 | 3/3 |
| Control/No Preheating | 0/0 | 3/19 |
| Control/No Stomping | 0/0 | 3/8 |
| Control/No Teflon Tape | 0/0 | 4/19 |

*number of leaks in the number of welds that leaked out of 20 that were tested.

Having thus described the thermoplastic material cutting and sealing apparatus and method of the present invention in detail and by reference to a preferred embodiment thereof, it will be apparent that modifications and variations are possible without departing from the scope of the invention defined in the appended claims.

What is claimed is:

1. In a process for cutting multiple plies of thermoplastic material having thickened sections resulting from the presence of zipper closures and for concurrently sealing severed margins thereof, the combination comprising the steps of:
   (a) preblocking said thermoplastic material in areas of said material to be severed and sealed which are located adjacent to the zipper closure portions thereof;
   (b) next, blocking said thermoplastic material in areas of said material to be severed and sealed which are located both adjacent to said zipper closure portions and throughout remaining sections thereof to render said thermoplastic material tacky and temporarily stick said multiple plies together in said areas; and
   (c) then, contacting all of said areas of said thermoplastic material to be severed and sealed with a heated cutting and sealing element so as to sever all of said multiple plies and concurrently seal said severed margins thereof together.

2. The process of claim 1 further comprising, after step (b) but before step (c), preheating said zipper closure portions of said material in said areas thereof to be severed and sealed by applying heat thereto.

3. The process of claim 2 wherein said preheating of said zipper closure portions is performed by applying heat thereto at a temperature higher than the temperature of the heat applied to said material adjacent to said zipper closure portions thereof in said preblocking of said material.

4. The process of claim 2 wherein said blocking of said material both adjacent to said zipper closure portions and throughout remaining sections thereof is performed by the applying of heat thereto at a temperature higher than the temperature of the heat applied in said preblocking of said material adjacent to said zipper closure portions thereof and lower than the temperature of the heat applied in said preheating of said zipper closure portions of said material.

5. The process of claim 1 further comprising, after step (c), stomping said zipper closure portions at said severed and sealed margins of said material to ensure sealing thereof.

6. In a process for cutting multiple plies of thermoplastic material having thickened sections formed by matable parts of zipper closures and for concurrently sealing severed margins thereof to produce individual plastic bags having seals along opposite edges thereof and at ends of said matable parts of said zipper closures thereof, the combination comprising the steps of:
   (a) preblocking said thermoplastic material in areas thereof to be severed and sealed which are located adjacent to said zipper closures thereof by applying heat thereto at a first temperature;
   (b) next, blocking said thermoplastic material in areas of said material to be severed and sealed which are located both adjacent to said zipper closures and throughout remaining sections thereof by applying heat thereto at a temperature to render said thermoplastic material tacky and temporarily stick said multiple plies together in said areas;
   (c) then, preheating said zipper closures of said thermoplastic material in areas thereof to be severed and sealed by applying heat thereto; and
   (d) finally, contacting said areas of said thermoplastic material with a heated cutting and sealing element so as to sever all of said multiple plies and concurrently seal said several margins thereof together.

7. The process of claim 6 further comprising, after step (d), stomping said zipper closures at said severed and sealed margins of said material to ensure sealing thereof.

8. In an apparatus for cutting multiple plies of thermoplastic material having zipper closure portions and for concurrently sealing severed margins thereof, the combination comprising:
(a) means for preblocking said thermoplastic material in areas of said material to be severed and sealed which are located adjacent to said zipper closure portions thereof;
(b) means for blocking said thermoplastic material in areas of said material to be severed and sealed which are located both adjacent to said zipper closure portions and throughout remaining sections thereof to render said thermoplastic material tacky and temporarily stick said multiple plies together in said areas; and
(c) means for contacting and heating all of said areas of said thermoplastic material to be severed and sealed so as to sever all of said multiple plies and concurrently seal said severed margins thereof together.

9. The apparatus of claim 8 in which said preblocking means includes a pair of block-like members mounted for relative movement toward and away from each other, said pair of block-like members being disposed on opposite sides of said thermoplastic material and facing toward the areas of said material to be severed and sealed which are located adjacent to said zipper closure portions thereof, at least one of said block-like members being heated.

10. The apparatus of claim 9 in which said blocking means includes a pair of elongated bar-like members mounted for relative movement toward and away from each other, said pair of elongated bar-like members being disposed on opposite sides of said thermoplastic material and facing toward the areas of said material to be severed and sealed which are located both adjacent to said zipper closure portions and throughout said remaining sections thereof, at least one of said bar-like members being heated.

11. The apparatus of claim 10 in which one of said bar-like members includes a coating of resiliently yieldable material facing toward said material.

12. The apparatus of claim 11 in which said coating has a slot defined therein aligned to receive said zipper closure portions of said thermoplastic material.

13. The apparatus of claim 8 further comprising means for preheating said zipper closure portions of said thermoplastic material in said areas thereof to be severed and sealed, said preheating means being operable to apply heat thereto.

14. The apparatus of claim 13 in which said preblocking means is operable to apply heat to said material and said blocking means is operable to apply heat to said material, the heat applied by said blocking means being at a temperature higher than the temperature of the heat applied by said preblocking means and lower than the temperature of the heat applied by said preheating means.

15. The apparatus of claim 13 in which said preheating means includes:
a pair of block-like elements adapted to apply heat to said zipper closure portions of said material in said areas to be severed and sealed;
a pair of guide elements adapted to receive said zipper closure portions of said material therebetween and to guide the same in alignment with said block-like elements; and
mounting means for disposing said block-like elements and said guide elements on opposite sides of said thermoplastic material, supporting said block-like elements for relative movement toward and away from each other, and supporting said guide elements for relative movement toward and away from each other.

16. The apparatus of claim 15 in which said mounting means includes a pair of arms being mounted at the same respective ends for pivotal movement toward and away from on another, said arms supporting said respective block-like elements at locations spaced from said same respective ends thereof.

17. The apparatus of claim 16 in which said preheating means includes spring means interconnecting said arms and biasing the same for pivotal movement toward one another.

18. The apparatus of claim 16 in which said preheating means further includes actuating means disposed adjacent said arms and being operable to cause said pivotal movement of said arms and said block-like elements therewith.

19. The apparatus of claim 18 in which said arms have defined thereon at said same respective ends thereof oppositely inclined cam lobes.

20. The apparatus of claim 19 in which said actuating means includes:
an actuator operable for movement between extended and retracted positions; and
a wedge element connected to said actuator and disposed between said cam lobes on said arms, said wedge element causing pivotal movement of said arms away from one another and permitting pivotal movement of said arms toward one another upon movement of said actuator correspondingly between its extended and retracted positions.

21. The apparatus of claim 15 in which said mounting means includes a pair of levers being mounted at the same respective ends for pivotal movement toward and away from one another, said levers supporting said respective guide elements at locations spaced from said same respective ends thereof.

22. The apparatus of claim 21 in which said preheating means includes spring means interconnecting said levers and biasing the same for pivotal movement toward one another.

23. The apparatus of claim 8 further comprising means for stomping said thickened sections at said severed and sealed margins of said material to ensure sealing thereof.

24. The apparatus of claim 23 in which said stomping means includes a pair of rolls disposed on opposite sides of said material and adapted to cooperate together to apply pressure to said zipper closure portions at said severed and sealed margins of said material.

25. The apparatus of claim 24 in which one of said rolls is yieldably biased toward the other.

26. A preheating component for use in preheating zipper closure portions of multiple plies of thermoplastic material prior to cutting of said plies and sealing the severed margins thereof, said preheating component comprising:
(a) a pair of block-like elements adapted to apply heat to said zipper closure portions of the material in the areas to be severed and sealed;
(b) a pair of guide elements adapted to receive said zipper closure portions of the material therebetween and to guide the same in alignment with said block-like elements; and
(c) mounting means for disposing said block-like elements and said guide elements on opposite sides of the material, supporting said block-like element for relative movement toward and away from each other, and supporting said guide elements for relative movement toward and away from each other.

27. The preheating component of claim 26 in which said mounting means includes a pair of arms adapted to be mounted at the same respective ends for pivotal movement toward and away from one another, said arms supporting said respective block-like elements at locations spaced from said same respective ends thereof.

28. The preheating component of claim 27 further comprising spring means interconnecting said arms and biasing the same for pivotal movement toward one another.

29. The preheating component of claim 27 further comprising actuating means disposed adjacent said arms and being operable to cause said pivotal movement of said arms and said block-like elements therewith.

30. The preheating component of claim 29 in which said arms have defined thereon at said same respective ends thereof oppositely inclined cam lobes.

31. The preheating component of claim 30, in which said actuating means includes:
- an actuator operable for movement between extended and retracted positions; and
- a wedge element connected to said actuator and disposed between said cam lobes on said arms, said wedge element causing pivotal movement of said arms away from one another and permitting pivotal movement of said arms toward one another upon movement of said actuator correspondingly between its extended and retracted positions.

32. The preheating component of claim 26 in which said mounting means includes a pair of levers adapted to be mounted at the same respective ends for pivotal movement toward and away from one another, said levers supporting said respective guide elements at locations spaced from said same respective ends thereof.

33. The preheating component of claim 32 further comprising spring means interconnecting said levers and biasing the same for pivotal movement toward one another.

34. In an apparatus for use in preheating zipper closure portions of multiple plies of thermoplastic material, as well as preheating areas of said thermoplastic material prior to cutting said plies and sealing the severed portions thereof, said apparatus comprising in combination:
- (a) means for preblocking said thermoplastic material in areas of said material to be severed and sealed which are located adjacent to said zipper closure portions thereof; and
- (b) means for blocking said thermoplastic material in areas of said material to be severed and sealed which are located both adjacent to said zipper closure portions and throughout material tacky and temporarily stick said multiple plies together in said areas prior to severing and sealing thereof.

35. The apparatus of claim 34 in which said preblocking means includes a pair of block-like members mounted for relative movement toward and away from each other, said pair of block-like members being disposed on opposite sides of said thermoplastic material and facing toward the areas of said material to be severed and sealed which are located adjacent to said zipper closure portions thereof.

36. The apparatus of claim 35 in which said blocking means includes a pair of elongated bar-like members mounted for relative movement toward and away from each other, said pair of elongated bar-like members being disposed on opposite sides of said thermoplastic material and facing toward the areas of said material to be severed and sealed which are located both adjacent to said zipper closure portions and throughout said remaining sections thereof.

37. The apparatus of claim 36 in which one of said bar-like members includes a coating of a resiliently yieldable material facing toward said material.

38. The apparatus of claim 37 in which said coating has a slot defined therein aligned to receive said zipper closure portions of said thermoplastic material.

39. In an apparatus for cutting multiple plies of thermoplastic material having zipper closure portions and for concurrently sealing severed margins thereof, the combination comprising:
- (a) means for contacting and heating all of the areas of said thermoplastic material to be severed and sealed so as to sever and seal all of said multiple plies and concurrently seal the severed margins thereof together; and
- (b) means for stomping said zipper closure portions of said thermoplastic material at said severed and sealed margins of said material to ensure sealing thereof.

40. The apparatus of claim 39 in which said stomping means includes a pair of rolls disposed on opposite sides of said material and adapted to cooperate together to apply pressure to said zipper closure portions at said severed and sealed margins of said material.

41. The apparatus of claim 40 in which one of said rolls is yieldably biased toward the other.

42. The apparatus of claim 39 in which said means for contacting and heating said thermoplastic material to be severed and sealed includes a hot knife and a seal roll adapted to cooperated in severing said plies and concurrently seal the severed margins thereof.

43. The apparatus of claim 42 in which said seal roll includes a wrap of a resiliently yieldable tape on the circumference thereof in the region aligned with said zipper closure portions of said thermoplastic material.

44. The apparatus of claim 43 in which said tape comprises a polytetrafluoroethylene-impregnated fiberglass.

* * * * *

UNITED STATES PATENT AND TRADEMARK OFFICE
CERTIFICATE OF CORRECTION

PATENT NO. : 4,812,192

DATED : March 14, 1989

INVENTOR(S) : Woods et al.

It is certified that error appears in the above-identified patent and that said Letters Patent is hereby corrected as shown below:

Column 2, line 36, "heating" should correctly appear --heated--.

Column 2, line 65, "one-severedmaterial" should correctly appear --one-severed material--.

Column 8, line 8, "componoent" should correctly appear --component--.

Column 8, line 18, "several" should correctly appear --severed--.

Column 8, line 26, "closure 20" should correctly appear --closure 28--.

Column 10, line 62, "several" should correctly appear --severed--.

Column 12, line 8, "on" should correctly appear --one--.

Column 13, line 1, "element" should correctly appear --elements--.

Signed and Sealed this

Fifth Day of December, 1989

*Attest:*

JEFFREY M. SAMUELS

*Attesting Officer*     *Acting Commissioner of Patents and Trademarks*